United States Patent [19]

Bobsein et al.

[11] Patent Number: 5,024,876

[45] Date of Patent: Jun. 18, 1991

[54] REINFORCED PLASTIC COMPRISING POLY(ARYLENE SULFIDE SULFONE) POLYMER CONTAINING ETHER GROUPS MATRIX

[75] Inventors: Rex L. Bobsein, Bartlesville, Okla.; Mark L. Stone, Idaho Falls, Id.; Jon F. Geibel, Bartlesville, Okla.

[73] Assignee: Phillips Petroleum Company, Bartlesville, Okla.

[21] Appl. No.: 486,563

[22] Filed: Feb. 28, 1990

[51] Int. Cl.$^5$ ................. B32B 7/00; B32B 27/00; B32B 9/00; C08G 8/02
[52] U.S. Cl. .................. 428/272; 428/265; 428/408; 428/902; 528/125; 528/126; 528/174
[58] Field of Search ............. 428/408, 902, 265, 272; 528/125, 126, 174

[56] References Cited

U.S. PATENT DOCUMENTS

| | | | |
|---|---|---|---|
| 3,919,177 | 11/1975 | Campbell | 260/79.1 |
| 4,016,145 | 4/1977 | Campbell | 260/79.3 M |
| 4,108,837 | 8/1978 | Johnson et al. | 528/126 |
| 4,125,525 | 11/1978 | Campbell | 528/388 |
| 4,175,175 | 11/1979 | Johnson et al. | 528/125 |
| 4,680,224 | 7/1987 | O'Connor | 428/294 |
| 4,774,276 | 9/1988 | Bobsein et al. | 524/399 |
| 4,792,481 | 12/1988 | O'Connor et al. | 428/288 |
| 4,808,694 | 2/1989 | Edmonds et al. | 528/125 |
| 4,808,698 | 2/1989 | Bobsein et al. | 528/388 |
| 4,921,558 | 5/1990 | Johnson et al. | 428/408 |

*Primary Examiner*—George F. Lesmes
*Assistant Examiner*—James D. Withers
*Attorney, Agent, or Firm*—Beverly M. Dollar

[57] ABSTRACT

A reinforced plastic is provided which comprises a continuous long fiber reinforcing material in an ether group-containing poly(arylene sulfide sulfone) polymer matrix.

15 Claims, No Drawings

REINFORCED PLASTIC COMPRISING POLY(ARYLENE SULFIDE SULFONE) POLYMER CONTAINING ETHER GROUPS MATRIX

FIELD OF THE INVENTION

This invention relates to poly(arylene sulfide sulfone) polymers, PASS. In another of its aspects this invention relates to a process for the production of poly(arylene sulfide sulfone) polymers containing ether groups. In accordance with a further aspect this invention relates to reinforced plastics comprising a matrix prepared from poly(arylene sulfide sulfone) polymers containing ether groups and reinforcing material which consists essentially of continuous long fibers.

BACKGROUND OF THE INVENTION

A wide variety of high polymers have been prepared from aromatic compounds, many of which are currently produced and marketed on a moderate to large scale. While such polymers are useful in many areas, one property of high polymers, particularly those of the thermoplastic type, which needs to be improved is the ability to withstand high use temperatures. Thermoplastic high polymers frequently form a continuous matrix for reinforcing agents and fillers which are added to alter the properties of the polymers before they are shaped into useful articles such as electrical and automotive parts. High polymers that will withstand high use temperatures alone or in combination with other ingredients are desirable.

Accordingly, an object of this invention is to provide a process for producing poly(arylene sulfide sulfone) polymers containing ether groups exhibiting good high temperature properties and increased molecular weight. It is a further objective of this invention to provide a process employing aromatic diphenols for the preparation of poly(arylene sulfide sulfone) polymers containing ether groups suitable for use as the matrix in reinforced plastics.

SUMMARY OF THE INVENTION

In accordance with this invention reinforced plastics are provided which comprise a high molecular weight poly(arylene sulfide sulfone) polymer containing an ether link in the polymer backbone as the matrix. The reinforcing material consists essentially of continuous long fibers. The polymer used as a matrix is prepared in a two step process. In a first step a prepolymer comprising essentially dihalo-terminated polyethersulfone oligomers can be prepared by reacting an aromatic diphenol with a substantial excess of a dihalo aromatic sulfone, in the presence of a polar organic compound and an alkali metal base, and optionally in the presence of an alkali metal carboxylate. During this first step, the reaction mixture can be vented when the reactor temperature is in the range of 100° to 150° C. in order to increase molecular weight. Molecular weight can also be increased by limiting the first step reaction to a period in the range of 1 minute to 2 hours. Subsequently, in a second step a sulfur source, an alkali metal carboxylate and water are added to the reaction mixture and the polymerization reaction is continued, resulting in a modified poly(arylene sulfide sulfone) polymer of improved glass transition temperature and softening temperature.

As used herein, the term "irregular polymer" is meant to represent a polymer whose molecules cannot be described by only one species of repeating unit in a single sequential arrangement. The polymers produced by the invention process include aromatic (arylene), sulfide, sulfone and ether groups in the backbone. These groups can be alternating in any sequences such that blocks of a constitutional repeating unit are present.

Dihaloaromatic sulfones that can be employed in the process of the invention are bis(halophenyl)sulfones, optionally having each phenyl ring substituted with one to four R groups, wherein each R group is individually and independently selected from the group consisting of hydrogen and alkyl groups having 1 to about 4 carbon atoms, and the total number of carbon atoms in each molecule is within the range of 12 to about 44. The presently preferred bis(halophenyl) sulfone is bis(p-chlorophenyl) sulfone.

Examples of suitable bis(halophenyl) sulfones that can be employed in the process of this invention include bis(p-chlorophenyl)sulfone, bis(fluorophenyl)sulfone, bis(p-bromophenyl)sulfone, bis(iodophenyl)sulfone, bis(2-methyl-4-chlorophenyl)sulfone, bis(2,5-dimethyl-4-chlorophenyl)sulfone, p-chlorophenyl p-bromophenyl sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, and the like, and mixtures thereof.

One type of aromatic diphenol that can be employed in the process of this invention is bis(alkylhydroxyphenyl) derivatives having the generalized structure.

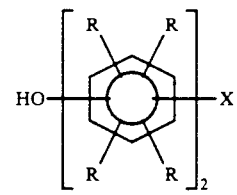

where X is —S—, —SO—, —SO$_2$—, —O—, a bond or an alkylene radical, and wherein each R is individually and independently selected from the group consisting of hydrogen and alkyl groups having 1 to about 4 carbon atoms. Examples of aromatic diphenols where X is —S— or —SO$_2$— include bis(4-hydroxyphenyl)sulfide (Bisphenol T), and bis(4-hydroxyphenyl)sulfone (Bisphenol S).

When X is an alkylene radical, the aromatic diphenols are bis(alkylhydroxyphenyl) alkanes which are characterized by having an alkylene radical link between two phenolic groups as represented by the formula (1)

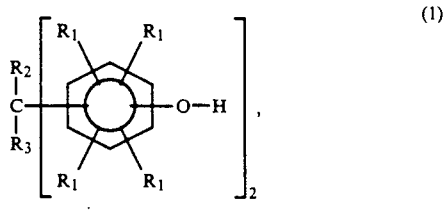

(1)

where each R$_1$ is individually and independently selected from the group consisting of hydrogen and alkyl groups having 1 to about 4 carbon atoms, and each R$_2$ and R$_3$ are individually and independently selected from the group consisting of hydrogen and unsubstituted and substituted alkyl groups having 1 to about 11 carbon atoms where the sum of the carbon atoms represented by $R_2$ plus $R_3$ is less than 12 carbon atoms, and the sum of the carbon atoms in $R_1$, $R_2$, and $R_3$ groups do not exceed 43; thus the total number of carbon atoms in each molecule is within the range of 13 to about 55.

Examples of suitable aromatic diphenols having this structure that can be employed in the process of this invention include, among others: bis(4-hydroxyphenyl)methane, bis(2-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(3-methyl-4-hydroxyphenyl)propane, 2,2-bis(2-isopropyl-4-hydroxyphenyl)propane, 2,2-bis(3-butyl-4-hydroxyphenyl)propane, 2,2-bis(4-hydroxyphenyl) 1,1,1,3,3,3-hexafluoropropane, and the like, and mixtures thereof. Preferred are 2,2-bis(4-hydroxyphenyl)propane, commonly known as Bisphenol A, and 2,2-bis(4-hydroxyphenyl) 1,1,1,3,3,3-hexafluoropropane, commonly known as Hexafluorobisphenol A.

Examples of other types of aromatic diphenols include hydroquinone(s), biphenol(s), dihydroxynaphthalene(s), bis(hydroxyphenyl)ketone(s), dihydroxyphenylphenylketone(s), dihydroxyfluorenone(s) and alkyl and aryl ring-substituted derivatives thereof.

Polymerizable sulfur sources that can be employed in the process of this invention include hydrogen sulfide, alkali metal hydrosulfides such as sodium hydrosulfide, potassium hydrosulfide, alkali metal sulfides such as sodium sulfide or potassium sulfide, and mixtures thereof. Additional sulfur sources include, among others, those cited in U.S. Pat. No. 3,919,177 such as the acyclic and cyclic thioamides exemplified by N-methyl-2-pyrrolidinethione.

Alkali metal bases that can be employed in the process of this invention include lithium hydroxide, sodium hydroxide, potassium hydroxide, rubidium hydroxide, cesium hydroxide, lithium carbonate, sodium carbonate, potassium carbonate and mixtures thereof. In one embodiment an alkali metal hydroxide is added in the second step as the anhydrous solid. In a preferred embodiment sodium carbonate is added in the first step in an amount required for both steps.

Alkali metal carboxylates that can be employed in the process of this invention can be represented by the formula R'COOM, where R' is a hydrocarbyl radical selected from alkyl, cycloalkyl, and aryl, and combinations thereof such as alkylaryl, arylalkyl, and the like, the number of carbon atoms in R' being within the range of 1 to about 20, and M is an alkali metal selected from the group consisting of lithium, sodium, potassium, rubidium and cesium. Preferably, R' is an alkyl radical having 1 to about 6 carbon atoms or a phenyl radical, and M is sodium. If desired, the alkali metal carboxylate can be employed as a hydrate or as a solution or dispersion in a liquid. In a preferred embodiment the alkali metal carboxylate is added as the anhydrous salt.

Examples of some alkali metal carboxylates that can be employed in the process of this invention include lithium acetate, sodium acetate, potassium acetate, lithium propionate, sodium propionate, rubidium butyrate, lithium valerate, sodium valerate, cesium hexanoate, lithium cyclohexane carboxylate, potassium benzoate, sodium benzoate, lithium benzoate, and the like, and mixtures thereof. Sodium acetate is the preferred alkali metal carboxylate.

The polar organic compounds that can be used in the method of this invention should be substantially liquid at the reaction temperatures and pressures employed. It is preferred to use organic amides. Suitable amides can be cyclic or acyclic and can have 1 to about 10 carbon atoms per molecule. Examples of suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, epsilon-caprolactam, dimethyl-benzamide and the like, and mixtures thereof. N-methyl-2-pyrrolidone (NMP) is the presently preferred polar organic compound.

Other suitable polar organic compounds include 1,3-dimethyl-2-imidazolidinone, dimethylsulfoxide, sulfolane, tetramethylurea, and hexamethylphosphoramide and mixtures thereof with an organic amide such as exemplified in the preceding paragraph.

The preferred poly(arylene sulfide sulfone) polymers produced by the process of this invention can be characterized as irregular polymers, the molecules of which cannot be described by only one species of unit in a single sequential arrangement. The irregular polymers can be characterized as having at least the units of (a) -(thio-1,4-phenylenesulfonyl-1,4-phenylene)-, illustrated by the formula (2)

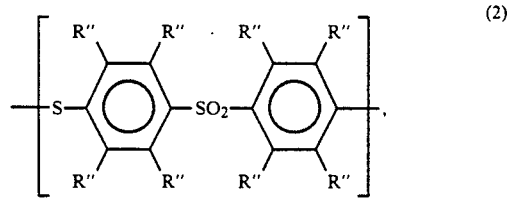

where each $R''$ is individually and independently selected from the group consisting of hydrogen and alkyl groups having 1 to about 4 carbon atoms, wherein the total number of carbon atoms in each unit is within the range of 12 to about 44, and (b) (oxy-1,4-phenylenealkylene-1,4-phenyleneoxy-1,4-phenylenesulfonyl-1,4-phenylene) illustrated by the formula (3)

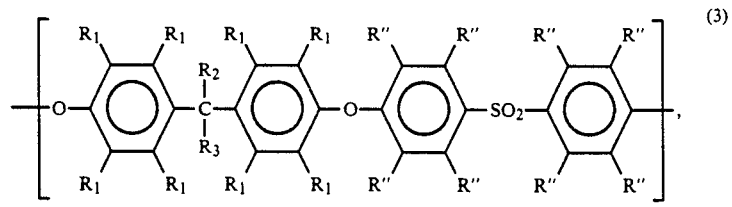

where $R_1$, $R_2$, and $R_3$ can be defined as in formula (1) and where $R''$ can be defined as in formula (2) above, and wherein units (b) are randomly dispersed among sequences of variable length of units (a).

A wide variety of reaction conditions can be employed in the practice of the invention. Similarly, any proportions of reactants which will react with each other to produce the irregular polymers of the invention are within the scope of the invention.

In the first step of the inventive process the aromatic diphenol is reacted with an excess of the dihaloaromatic sulfone, the excess conveniently being expressed as the ratio of moles dihaloaromatic sulfone to moles aromatic diphenol. This molar ratio can vary from about 1000/1 to about 1.001/1 as a broad range, preferably from about 100/1 to about 1.01/1, and most preferably from about 10/1 to about 4/1.

In the first step of the preferred inventive process, for example, the mole ratio of reactants can be chosen such that the dihalo-terminated polyethersulfone oligomers formed are characterized as predominantly comprising the oligomer resulting from the reaction of two moles of the dihaloaromatic sulfone with one mole of aromatic diphenol.

Such oligomers are achieved by conducting the reaction at a molar ratio of dihaloaromatic sulfone to aromatic diphenol within the range of about 8/1 to about 20/1 in the first step. The mole ratio of alkali metal base to aromatic diphenol can vary but generally will be within the range of about 2/1 to about 25/1, preferably about 10/1 to about 20/1. The amount of polar organic compound can vary greatly, generally being within the range of about 5 moles to about 15 moles per mole of the dihaloaromatic sulfone, preferably about 6 to about 10 moles. When the optional alkali metal carboxylate is added in the first step, the mole ratio of alkali metal carboxylate to dihaloaromatic sulfone can vary over a wide range but generally will be within the range of about 0.5/1 to about 3/1, preferably about 1/1 to about 2/1.

In the second step of the inventive process, the amount of sulfur source added is chosen such that the ratio of the moles of dihaloaromatic sulfone minus the moles of aromatic diphenol to the moles sulfur source, can be within the range of about 2/1 to about 0.8/1, preferably about 1.25/1 to about 0.9/1, and most preferably about 1.05/1 to about 0.95/1. The molar ratio of alkali metal base to sulfur source added in the second step can be within the range of about 0.5/1 to about 3/1, preferably about 1.1/1 to about 2.2/1. When the alkali metal carboxylate is added totally in the second step, the molar ratio of alkali metal carboxylate to dihaloaromatic sulfone charged can vary over a wide range, but generally will be within the range of about 0.5/1 to 2/1.

A polar organic compound is used as a transfer medium during the addition of sulfur source and alkali metal carboxylate. Water is also added to bring the total water, including water of hydration, present in the polymerization system to an amount of at least about 3.5 moles water per mole of sulfur source and an amount greater than about 0.5 moles per mole of polar organic compound. Water of hydration can be contained in the sulfur source and the alkali metal base and must be taken into account.

When N-methyl-2-pyrrolidone (NMP) is used as the polar organic compound, the NMP and water are added in amounts such that the ratio of the moles total water including water of hydration to the moles total NMP is greater than about 0.5, preferably in the range from about 0.8 to about 1.5.

It is to be understood that the process of this invention can be carried out by mixing the dihaloaromatic sulfone, the aromatic diphenol, the alkali metal base, the polar organic compound and optionally, the alkali metal carboxylate in any order in a first process step. Then, in a second process step the sulfur source, the alkali metal carboxylate and, if required, the remaining quantity of the alkali metal base and polar organic compound are added. The alkali metal carboxylate must be added in this step when it is not present in the first step.

Although the temperature at which reaction in the first process step is conducted can vary over a considerable range, generally it is within the range of about 150° to about 250° C., preferably about 160° to about 225° C., and most preferably about 175° to about 200° C.

It has been discovered that poly(arylene sulfide sulfone) polymers containing ether groups which have high molecular weight can be prepared by venting the reactor during the first step. The venting procedure is preferably performed in the range of 100°-150° C., preferably about 120° C. The venting procedure is performed until all or at least a portion of the water has been removed. The amount of time during which the venting is continued is generally governed by process and economic limitations and can be determined by one of ordinary skill in the art without undue experimentation.

The reaction temperature in a second process step generally is within the range of about 175° to about 235° C., preferably about 190° to about 215° C., and most preferably about 195° to about 205° C.

The reaction time of each of the two process steps can vary widely, depending in part on the reaction temperature, but generally will be within the range of about 1 minute to about 24 hours, preferably about 5 minutes to about 8 hours. It has also been discovered that the molecular weight of the polymer can be increased by limiting the first step reaction time to a period in the range of 1 minute to 2 hours, more preferably 5 minutes to 1 hour. The pressure should be sufficient to maintain the dihaloaromatic sulfone and the polar organic compound substantially in the liquid phase.

After the second step of the reaction has proceeded for the desired time, the reaction mixture is cooled. The mixture can be cooled slowly by discontinuation of the heating, or alternately, more rapidly by introduction of a coolant through internal or external coils. In a preferred embodiment a fluid is added to the reaction mixture after the heating is discontinued to cool it more rapidly and in some cases aid in the separation of the polymer from the remainder of the reaction mixture. Water, N-methyl-2-pyrrolidone or mixtures thereof can be added during a time period which is shorter than the second step reaction time. For example, liquid NMP in an amount equivalent to about ⅛ to ¼ of the total NMP used in the two-step reaction process is added to the reaction mixture over a five minute period after the heat is discontinued. The reaction mixture is allowed to cool further before the polymeric solids are recovered. Use of a fluid improves the recovery of polymeric solids in that particles easily recovered by filtration are formed.

The poly(arylene sulfide sulfone) polymers produced by the inventive process can be separated from the reaction mixture by conventional procedures such as by filtration, followed by washing the recovered solids with water, or by dilution of the reaction mixture with a suitable diluent such as N-methyl-2-pyrrolidone and/or water followed by filtration and water washing of the recovered solids.

The poly(arylene sulfide sulfone) polymers recovered are characterized by having a polymer melt temperature in excess of about 250° C., preferably in excess of about 275° C., and even more preferably in excess of about 290° C., and a measurable melt flow rate using ASTM D 1238 condition 317/5.0 (modified employ a 5 minute preheat time) of less than about 5000 g/10 minutes, preferably less than about 1000 g/10 minutes, and even more preferred less than about 100 g/10 minutes. Polymers prepared according to this invention generally exhibit an inherent viscosity (0.5 g/100 mL NMP at 30°/C.) greater than about 0.30 dL/g, more preferably from about 0.30 to about 0.60 dL/g.

Optionally, treatment of the dried polymeric solids with a aqueous solution containing 0.01 to 5 wt.% zinc acetate based on dry polymer in 5 to 50 fold amounts of water (relative to dry polymer) for about 0.5 to about 2 hours at about 150 to about 200° C. can yield treated-polymeric solids having an improved melt stability.

Melt stability of a polymeric solid can be characterized as the ratio of the melt flow raters measured after 5 and 15 minutes holding time of the molten polymeric solids in the barrel of the apparatus described in ASTM D 1238, condition 317/5.0. A melt stable polymeric solid demonstrates only a small difference in the two measured melt flow rates. Therefore, the ratio of the two melt flow rates does not vary appreciably from 1, preferably in the range from about 0.80 to about 1.2. Unless otherwise noted herein, melt flow rates are measured using a 5 minute hold time and reported in units of grams/10 minutes in accordance with ASTM D 1238, condition 317/5.0. The poly(arylene sulfide sulfone) polymers produced by the inventive process can be blended with fillers, pigments, extenders, other polymers, and the like.

The poly(arylene sulfide sulfone) polymers containing ether groups can be employed as the continuous matrix in fiber reinforced compositions such as prepregs, laminates and pultruded shapes.

Such fiber reinforced compositions can be prepared by any method known to those of ordinary skill in the art. Examples of such methods are those described in U.S. Pat. Nos. 4,680,224 and 4,792,481, which patents are hereby incorporated by reference herein.

Generally, the amount of polymer matrix in the reinforced plastic is in the range of 25 to 50 wt. % of the fully consolidated composition.

The poly(arylene sulfide sulfone) polymers containing ether groups can be cured through crosslinking and/or chain extension to provide cured products having high thermal stability and good chemical resistance. They are useful in the production of coatings, film, molded objects and fibers. The polymers exhibit improved propertides, especially the melting temperature and the glass transition temperature.

Polymer melt temperature, PMT, is expressed in degrees Celsius, and is determined by observing where the polymeric solids melt on a temperature gradient bar. The glass transition temperature, Tg, is measured using Perkin-Elmer Differential Scanning Calorimeter, Model DSC-2 C. The inherent viscosity of the polymeric solids is measured at 30° C. using as solvent either a 3:2 mixture (by weight) of phenol: 1,1,2,2-tetrachloroethane or N-methyl-2-pyrrolidone at a solids concentration of 0.5 grams per 100 mL. The units of inherent viscosity (I.V.) are deciliters per gram, dL/g.

EXAMPLE 1

Preparation of Poly(arylene sulfide sulfone) polymers containing ether groups

Three separate polymerizations were performed. Polymerization 1 was conducted as follows.

Into a 2-gallon stainless steel autoclave 1.5 moles bis(4-chlorophenyl)sulfone (430.76 grams), 3 moles sodium carbonate (318.0 grams), 6.0 moles N-methyl-2-pyrrolidone (594.78 grams), and 0.15 moles Bisphenol A (34.24 grams) were introduced. The autoclave was closed and purged with nitrogen simultaneously with heating and stirring at 600 rpm. The temperature was increased to 200° C. and held for 6 minutes. The autoclave was cooled to less than 80° C. Subsequently, the reactants of the second step were introduced: 1.5 moles sodium acetate (123.06 grams), 1.36 moles sodium hydrosulfide (128.58 grams as a 59 wt. % aqueous solution), 6.0 moles N-methyl-2-pyrrolidone, and 11.17 moles water (201.24 grams). The autoclave temperature was increased to 200° C. and maintained at that temperature for 3 hours. The autoclave was then cooled to room temperature and opened to remove the polymer slurry.

The dried product was characterized as having a melt flow (MF) at 343° C. of 26.4 and an I.V. of 0.38. The polymer product was given both hot and cold water washes and filtered and dried. A total of 403.4 grams of dried polymeric solids was recovered.

The polymer was thereafter treated with an aqueous solution of zinc acetate (3.61 g zinc acetate in 3000 mLs $H_2O$) at 150° C. for 1 hour. The resulting polymer slurry was cooled and the polymer was recovered and washed with cold $H_2O$ several times until the filtrate was clear. This product is designated as Invention Polymer 1.

EXAMPLE 2

A second polymerization was conducted in a manner very similar to that of Example 1. The same types of reactants were added as in Example 1. The same amounts of reactants were added except as follows: 1.377 moles of the sodium hydrosulfide was used. The two step polymerization was conducted in the same manner as that of Example 1. The autoclave was cooled to room temperature, but NMP was additionally employed as a cooling fluid. The polymer was recovered and treated as in Example 1.

The dried product (Polymer 2) was characterized as having a large particle size, a MF at 343° C. of 18.8 and an I.V. of 0.45 (after treatment). A total of 402.5 grams of dried polymeric solids was recovered.

EXAMPLE 3

One more polymerization was conducted. Polymer 3 was prepared in essentially the same manner as that of Example 2, except that 1.35 moles of sodium hydrosulfide and 10.5 moles $H_2O$ were added, in the second step. The polymer was recovered as in Example 2 and treated as in Example 1.

The dried product (Polymer 3) was characterized as having a large particle size, a MF at 343° C. of 63.2 and an I.V. (after treatment) of 0.44. A total of 403.4 grams of dried polymeric solids was recovered.

EXAMPLE 4

This example describes the preparation of a carbon fiber reinforced composite from a control PPSS sample and a sample prepared from a blend of inventive copolymers. Both polymer samples were ground to a fine powder with a particle size of about 20 microns.

The control poly(phenylene sulfide sulfone) (PPSS) sample was prepared according to the method described in U.S. Pat. No. 4,808,698 and treated with aqueous zinc acetate as described in U.S. Pat. No. 4,774,276.

This polymer is designated Control PPSS polymer.

A slurry bath was prepared from 87.5 g of the Control PPSS sample, 2100 g of distilled water, and 2 mL of an ethoxylated nonylphenol (Triton X-100) surfactant. The tows of continuous carbon fiber reinforcement (12K Hercules AS-4) were passed through the aqueous PPSS bath at a rate of about 125 cm per minute and fiber tensions of about 73 g. The wet, impregnated continuous carbon fiber strands were pulled through a guide mechanism, a drying section at about 420° C., and a heated (366° C.) shaping die. The product was tape A with a width of about 28.6 mm.

A similar slurry bath was prepared with 87.5 g of a blend of Polymers 1, 2 and 3, 2100 g of distilled water, and 2 mL of the surfactant. A carbon fiber reinforced tape B was prepared using a dryer temperature of about 410° C., a shaping die temperature of about 363° C., and fiber tensions of about 76 to 80 g.

The continuous prepreg tapes A and B, which contained about 66 weight percent carbon fiber, were cut into about 25 cm lenghts and plied for compression molding into unidirectional laminates about 1.3 mm thick for testing. Test specimens were cut from the laminates. The test results are shown in Table I.

TABLE I

| | Composite Properties | |
| --- | --- | --- |
| Sample | A | B |
| Longitudinal Tensile Strength[a], MPa | 2038 | 1989 |
| Longitudinal Flexural Strength[b], MPa | 1556 | 1961 |
| Transverse Tensile Strength[a], MPa | 38 | 44 |
| Transverse Flexural Strength[b], MPa | 66 | 70 |
| Longitudinal Compressive Strength[c], MPa | 775 | 970 |

[a] ASTM D 3039
[b] ASTM D 790
[c] ASTM D 3410

As seen from the data in Table I, the composite prepared using poly(arylene sulfide sulfone) containing ether groups as the matrix (laminate B) generally exhibits improved mechanical properties such as increased longitudinal flexural strength, transverse tensile strength, transverse flexural strength, and greatly increased longitudinal compressive strength (970 vs. 775).

While this invention has been described in detail for the purposes of illustration, it is not meant to be limited thereby, but is intended to cover all reasonable modifications thereof.

That which is claimed is:

1. A reinforced plastic comprising:
   (a) reinforcing material consisting essentially of continuous long fibers in
   (b) an ether group-containing poly(arylene sulfide sulfone) polymer matrix.

2. A reinforced plastic according to claim 1 wherein said ether group-containing poly(arylene sulfide sulfone) polymer is prepared by a two-step process which comprises
   (a) reacting a polar organic compound, a dihaloaromatic sulfone, an aromatic diphenol, and an alkali metal base under polymerization conditions in a first step; and then
   (b) adding a sulfur source and an alkali metal carboxylate in a second step and continuing polymerization conditions to form a recoverable poly(arylene sulfide sulfone) polymer containing ether groups.

3. A reinforced plastic according to claim 2 wherein said alkali metal carboxylate is represented by R'COOM, where R' is a hydrocarbyl radical selected from the group consisting of alkyl, cycloalkyl, aryl and combinations thereof with carbon atoms in the range of 1 to about 20 and M is an alkali metal.

4. A reinforced plastic according to claim 2 wherein in step (b) water is further added to bring the total water, including water of hydration, present to an amount of at least about 3.5 moles per mole of sulfur source and greater than about 0.5 moles per mole polar organic compound.

5. A reinforced plastic according to claim 2 wherein in step (b) N-methyl-2-pyrrolidone and water are added in amounts such that the molar ratio of the moles total water including water of hydration to the total moles NMP is in the range of about 0.8 to about 1.5.

6. A reinforced plastic according to claim 2 wherein the aromatic diphenol is characterized by having an alkylene radical link between two phenolic groups and the dihalo aromatic sulfone is a bis(halophenyl)sulfone.

7. A reinforced plastic according to claim 6 wherein the aromatic diphenol is 2,2-bis(p-hydroxyphenyl)propane and the bis(halophenyl)sulfone is bis(p-chlorophenyl)sulfone.

8. A reinforced plastic according to claim 2 wherein the alkali metal base is an alkali metal carbonate.

9. A reinforced plastic according to claim 8 wherein the alkali metal carbonate is sodium carbonate.

10. A reinforced plastic according to claim 6 wherein the aromatic diphenol is 2,2-bis(hydroxyphenyl)1,1,1,3,3,3-hexafluoropropane and the bis(halophenyl)sulfone is bis(chlorophenyl)sulfone.

11. A reinforced plastic according to claim 7 wherein the sulfur source is sodium hydrosulfide.

12. A reinforced plastic according to claim 2 wherein the polar organic compound is N-methyl-2-pyrrolidone.

13. A reinforced plastic according to claim 1 wherein said continuous long fibers are carbon fibers.

14. A reinforced plastic according to claim 1 wherein said reinforcing material comprises a woven mat.

15. A reinforced plastic according to claim 1 wherein said ether group-containing poly(arylene sulfide sulfone) polymer comprises 20 to 50% of said reinforced plastic.

* * * * *